(12) United States Patent
Hill et al.

(10) Patent No.: US 6,431,549 B1
(45) Date of Patent: Aug. 13, 2002

(54) METHOD AND APPARATUS FOR SEALING JOINTS BETWEEN COMPONENTS OF VEHICLES

(75) Inventors: James E. Hill, West Linn, OR (US); James L. Brown, Sanger, CA (US); Richard C. Jeffries, Portland, OR (US); Steven W. Hallstrom, Woodland; James S. Tregaskis, Vancouver, both of WA (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/489,456

(22) Filed: Jan. 21, 2000

(Under 37 CFR 1.47)

(51) Int. Cl.$^7$ .......................... E04B 1/682; F16J 15/08; B32B 7/04
(52) U.S. Cl. ...................... 277/316; 277/651; 296/210; 156/91; 156/295
(58) Field of Search .................. 156/91, 295; 277/651, 277/316, 922, 924, 906; 296/210, 213

(56) References Cited

U.S. PATENT DOCUMENTS

| | | | |
|---|---|---|---|
| 2,827,671 A | | 3/1958 | Martin |
| 2,974,078 A | | 3/1961 | Petritz et al. |
| 3,073,303 A | * | 1/1963 | Schaar .................. 156/295 |
| 3,434,903 A | | 3/1969 | Hann |
| 3,551,270 A | * | 12/1970 | Sharkey ................. 156/295 |
| 3,756,881 A | | 9/1973 | Denman |
| 4,154,473 A | | 5/1979 | Alexander et al. |
| 4,475,765 A | | 10/1984 | Vogt et al. |
| 4,792,180 A | | 12/1988 | Jacobsen et al. |
| 4,836,879 A | * | 6/1989 | Edwards ................. 156/330 |
| 4,883,310 A | | 11/1989 | Miyazaki et al. |
| 5,331,784 A | | 7/1994 | Agrawal et al. |
| 5,336,349 A | | 8/1994 | Cornils et al. |
| 5,540,478 A | | 7/1996 | Schüch |
| 5,769,486 A | | 6/1998 | Novoa et al. |
| 5,791,336 A | * | 8/1998 | Helm ................... 126/39 H |
| 5,795,014 A | | 8/1998 | Balgaard |
| 5,948,194 A | | 9/1999 | Hill et al. |
| 6,096,158 A | * | 8/2000 | Kahl et al. .............. 156/292 |

* cited by examiner

*Primary Examiner*—Anthony Knight
*Assistant Examiner*—Enoch E Peavey
(74) *Attorney, Agent, or Firm*—Klarquist Sparkman LLP

(57) ABSTRACT

A sealing method and apparatus involves positioning sealant carriers in a gap between first and second components to be sealed. Sealant is applied to a first major surface of the sealant carriers. As the first and second components are tightened together, the carriers are compressed and cause sealant to travel from the first major surface and through the carriers to a second major surface which is opposed to the first major surface. The sealant carriers may be positioned on respective carrier supports while sealant is being applied to the first major surface of the sealant carriers. The supports are used in initially positioning the sealant carriers in place and then are removed prior to tightening the first and second components together. The supports may include alignment mechanisms for use in aligning the sealant carriers with one of the first and second components. The sealant adheres the sealant carriers to such one of the first and second components following removal of the supports.

48 Claims, 8 Drawing Sheets

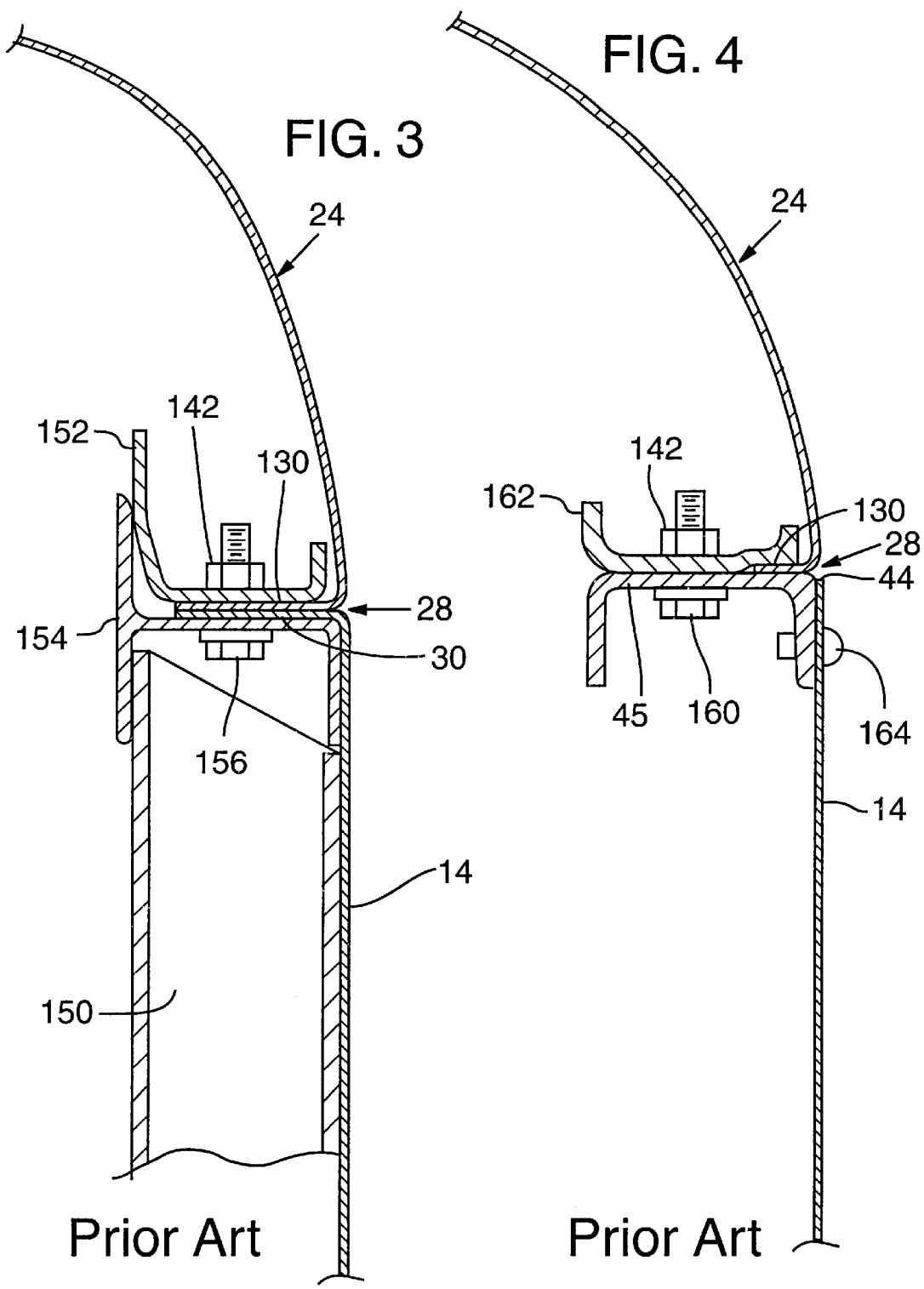

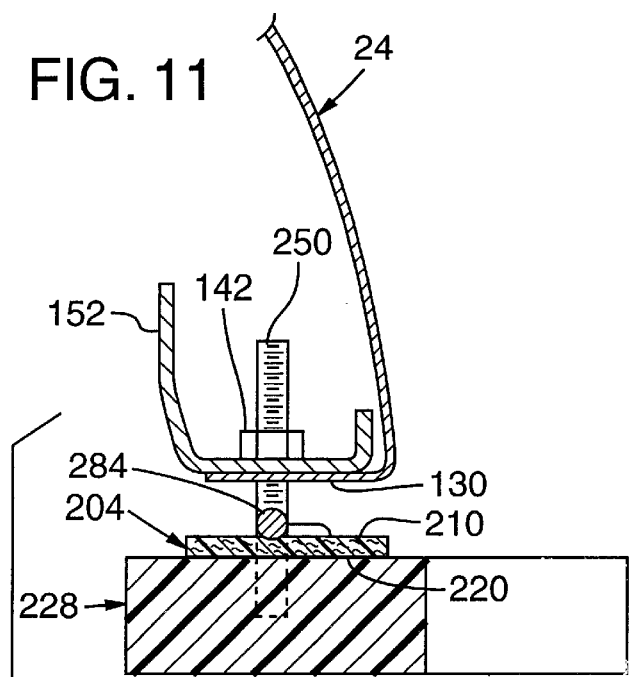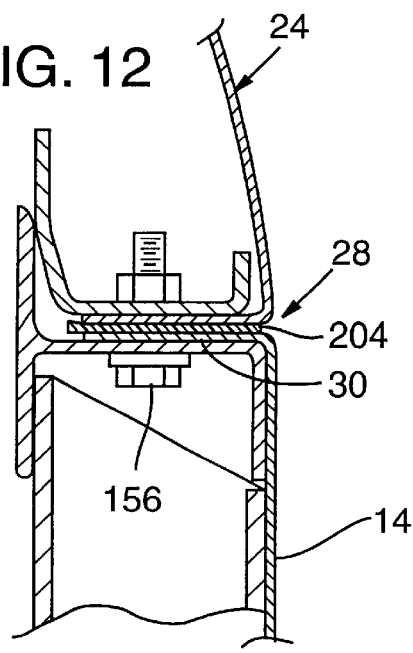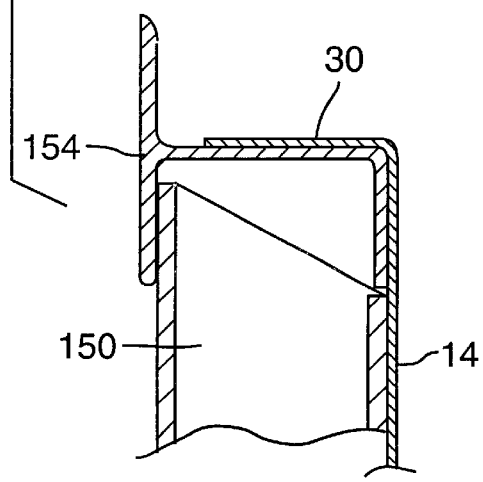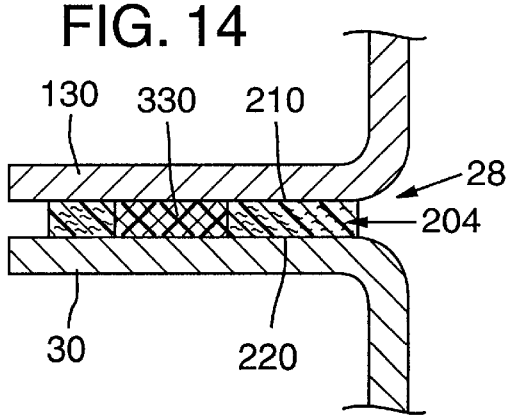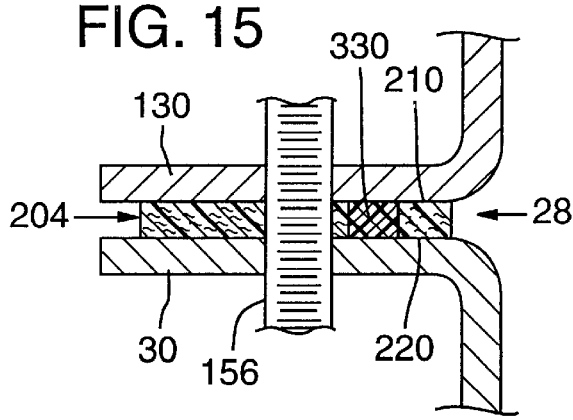

METHOD AND APPARATUS FOR SEALING JOINTS BETWEEN COMPONENTS OF VEHICLES

BACKGROUND

The present invention relates to methods and apparatus for sealing joints or gaps that exist between components of vehicles and has particular applicability to sealing joints between components against rain and the like from the exterior of a vehicle. For example, the invention has applicability to sealing a roof of a truck to sidewall and backwall structures of a truck.

In vehicles such as highway trucks which are exposed to severe weather conditions, it is desirable to have an efficient and effective mechanism and approach for sealing exposed joints of the truck against leakage of rain water and the like from the exterior of the truck. Horizontal joints that may exist between a roof component of a truck and walls of a truck are particularly susceptible to leakage and would especially benefit from an improved sealing approach. These trucks often have sleeper compartments or cabs that provide living space for drivers during long-haul operations. A manufacturer may have trucks with sleeper compartments of different sizes and configurations. For example, the sleeper compartment may be varied in length, along the longitudinal axis direction of the truck, for different truck models depending on factors such as how much space is to be provided for occupancy by individuals using the truck.

In one known approach, sealant is applied directly to an object to be sealed (e.g. onto a head gasket which is ready to be placed on an engine, onto the perimeter of a windshield prior to installation in a windshield opening, or directly to the upper portions of wall parts of a truck before a roof is assembled onto the wall parts. Commonly, a manually controlled tool such as a caulking gun is used to apply the sealant to the wall parts. In such a case, it is easy to over or under apply the quantity of the sealant. If sealant is over applied and the components are then brought together and fastened, the sealant may seep or be squeezed from the joint into undesired areas which then must be cleaned. If the sealant is under applied, unsealed gaps may be left in the joint. Also, in the case of a truck, this manual approach can slow down production time as the sealant is applied to the truck components as the truck components are being assembled in a truck assembly line.

In another known method of sealing roof and sidewall components of a vehicle, a foam and compression-limiting shim is positioned on wall components and between the components with the foam being compressed as the components are brought together. In this approach, the foam is adhesively backed on one side and is applied to the components without sealant being placed on the foam. It is also known in sealing building joints to place caulking or sealant between the joints with a foam strip along the exterior boundary of the joint. The foam strip acts as a dam to prevent the sealant from seeping out from the joint in the event, for example, the sealant warms and becomes less viscous due to sunlight hitting the building.

Although vehicles, including trucks, have existed for a long time with roofs and other components fastened in some manner together and with exterior joints of the trucks sealed in some manner, a need exists for an improved sealing system, apparatus, and method.

SUMMARY

In accordance with one aspect of an embodiment of the present invention, assume a first component of a vehicle is to be joined to a second component of a vehicle. In particular, the first component has a first component surface which is to be joined with a second component surface of a second component of the vehicle with a gap or joint therebetween. In accordance with the approach of this embodiment, sealant is applied to a first carrier surface of a porous sealant carrier member, the sealant carrier member having a second carrier surface which is opposed to the first carrier surface. By porous, it is meant that the sealant carrier member has sufficient porosity to permit the penetration or travel of sealant from the first carrier surface to the second carrier surface when pressure is applied to the sealant on the first carrier surface. In addition, in this embodiment, the viscosity of the sealant and the porosity of the sealant carrier member are preferably selected such that insignificant migration of sealant from the first carrier surface to the second carrier surface occurs prior to the application of pressure to sealant on the sealant carrier member. At least a portion of the first carrier surface containing sealant is placed in the gap between the first and second component surfaces. The gap is then closed so that at least a portion of the sealant carrier member containing the sealant is squeezed or compressed between the first and second component surfaces. This results in the application of pressure to the sealant on the first carrier surface. As a result, at least some of the sealant passes from the first carrier surface to the second carrier surface as the gap is closed. The sealant thus seals the gap. Closing of the gap may be accomplished in any convenient manner, such as by tightening bolts or other fasteners used to draw the first and second component surfaces toward one another. The first component may, for example, be a roof component of the vehicle and the second component may, for example, be a wall component of the vehicle.

The gap is typically an elongated gap. In this case, the sealant carrier members are typically elongated strips having first and second ends. The strips may be positioned end to end along a length of the gap with sealant being disposed to penetrate the sealant carrier strip typically along the full length of the strips to thereby seal the entire elongated gap.

The sealant may be applied non-uniformly to the first carrier surface of the sealant carrier member. The sealant may be applied as an elongated bead of sealant along at least a substantial portion of a length of a sealant carrier strip with the volume of the bead being selectively varied depending upon the location of the strip to which the bead is being applied. For example, a greater quantity of sealant may be applied at the respective ends of the strip, with about twice as much sealant being applied at such locations in one specific example. In the event a plurality of sealant strips are used to seal a gap, with the strips being arranged substantially end to end, the additional sealant at an end of a strip would flow into any space that may exist between adjacent strips to provide a seal at such locations. The strips are typically thin enough when compressed by closing the gap to not affect the operation of the seal even if the ends overlap one another. The sealant may also be applied in patterns other than an elongated sealant bead. For example, additional sealant may be applied in a cross or other pattern to fill and seal depressions, gaps or apertures in the surfaces which are being sealed.

In accordance with another aspect of an embodiment, the sealant carrier member may be positioned on a sealant carrier member support. In this case, the sealant carrier member is typically positioned with the first carrier surface exposed to receive the sealant. The sealant is typically applied while the sealant carrier member is carried or positioned on the support.

As a further aspect of an embodiment, the gap between the first and second components to be sealed may initially be sufficiently large to permit the initial positioning of the support and the sealant carrier member with the applied sealant in the gap. The support may be manipulated to bring the first carrier surface and sealant thereon into contact with one of the component surfaces, such as the first component surface. The sealant is typically somewhat tacky and consequently sticks to the first component surface. The support may then be removed. The sealant carrier member is detachably positioned on the support. The sealant carrier member is detached from the support and remains adhered by the sealant to the first component surface as the support is removed. This leaves the sealant carrier member in position for squeezing between the first and second component surfaces as these surfaces are thereafter brought together to close the gap. In the event the first component surface is a roof component of a vehicle, the method may include the act of raising the sealant carrier member support upwardly to bring the sealant carrier member toward the first component surface.

The first component may include a plurality of openings such as fastener receiving openings. In addition, the support may include a plurality of alignment pins. The alignment pins are arranged and sized for insertion into respective fastener receiving or other openings of the first component to align the support and thereby the sealant carrier member supported thereon with the first component surface. In addition, the sealant carrier member may include a plurality of openings, at least some of which may receive the alignment pins to thereby to align the sealant carrier member on the support. The sealant carrier member in this case remains aligned when the alignment pins of the support are inserted into the fastener receiving openings of the first component. The sealant carrier member may include openings which do not receive alignment pins but which, for example, correspond to additional fastener receiving openings in the first component. Consequently, during joining of the first and second components, fasteners may be inserted through respective openings in the sealant carrier member without disturbing the positioning of the sealant carrier member.

The first and second component surfaces may be inwardly directed flange elements of a respective roof and wall components (for example, sidewall and/or back wall components) of a vehicle. The sealant may be applied along the sealant carrier member outwardly of fastener receiving openings through the sealant carrier member. In addition, the quantity of sealant applied at such locations may be reduced to minimize the possibility of sealant being extruded from the gap at the location of the openings as the first and second components are brought toward one another.

As another aspect of an embodiment, at least one set of plural sealant carrier members may be provided. The set of sealant carrier members may be sized and shaped to follow the path of an elongated gap that exists between the first and second components, including curves in such components. The set may, for example, be a plurality of sealant carrier members for one-half (e.g. the driver's side half) of a truck. A second set of sealant carrier members may be provided for the passenger side of the truck. In general, the sealant carrier members may in one form comprise strips. The strips at either side of the vehicle may have a common shape. However, the sealant carrier members at the passenger side of the truck are typically mirror images of corresponding members at the driver's side of the truck.

In addition, a set of a plurality of sealant carrier member supports may be provided and configured to correspond to the set of sealant carrier members, for example, for a specific side of the truck. The sealant is then applied to one major surface of each of the sealant carrier members preferably while the sealant carrier members are on the respective supports. The set of sealant carrier member supports may be positioned on a rack with an alignment mechanism or strip carrier positioner being provided for assisting in positioning the supports at a desired location on the rack. The alignment mechanism may in one specific form comprise pins on the rack which are inserted into pin receiving openings of the supports. The pin receiving openings of the supports may be located in projecting handles which extend outwardly from body portions of the supports. Two spaced apart handles may be provided for each support with each handle including one of the alignment pin receiving openings. The sealant member carrier supporting surface of each support may be positioned in a common plane when the supports are mounted on the rack. The supported sealant carrier members may also each have a first major surface with the first major surfaces of each sealant carrier member located in a common plane. This facilitates the use of an x-y applicator to apply sealant to the exposed first major surfaces of the sealant carrier members when positioned on the supports when on the rack. In applications where there are more than one set of sealant carrier members and corresponding sealant carrier supports, the pattern of sealant application may vary depending upon which set of sealant carrier members and supports is on the rack. A detector may be provided for sensing which set is in place with an x-y sealant applicator adjusting the pattern of applied sealant to correspond to the defected set of sealant carrier members. The rack may assume any desired configuration and the term "rack" encompasses any mechanism for supporting the sealant carrier member supports during application of sealant to sealant carrier members on the supports.

In addition to joint sealing methods, the present invention also includes novel and unobvious aspects of an apparatus and system for accomplishing the joint sealing. Various aspects of the apparatus have been mentioned above and will be apparent from the description below.

The invention is not limited to a specific embodiment or embodiments. The invention is also not limited to a combination of all acts and elements described herein nor to a system and method which solves all of the problems of the prior art. That is, the invention is directed towards acts of accomplishing the sealing method and of elements of a sealing system and apparatus which are novel and unobvious, both individually and collectively, as set forth in the claims below. In addition, although described in connection with vehicle sealing component applications, our invention may also be used in sealing joints between components in other nonvehicular applications

BRIEF DESCRIPTION OF THE DRAWINGS

FIG. 3 is a vertical sectional view through a portion of the vehicle roof and wall, taken along line 3—3 of FIG. 1.

FIG. 4 is a vertical sectional view through a portion of the vehicle roof and wall, taken along line 4—4 of FIG. 1.

FIG. 11 schematically illustrates the positioning of a support with a sealant carrier member and sealant thereon as the sealant carrier member is brought toward one surface of components to be sealed, in accordance with one embodiment of the present invention.

FIGS. 12 and 13 are similar to FIGS. 3 and 4, but show a sealant carrier member in position between and sealing first and second components, the thickness of the sealant carrier member being exaggerated in these figures.

FIGS. 14 and 15 are vertical sectional views illustrating schematically, and with the thickness of the illustrated form of sealant carrier members exaggerated, the penetration of sealant from the first major surface of the sealant carrier members to a second major surface of the sealant carrier members when the first and second components are joined together.

DETAILED DESCRIPTION OF PREFERRED EMBODIMENTS

The preferred embodiments are described with reference to sealing a joint between surfaces of a roof and wall components of a vehicle and in this case a truck. The wall components comprise first and second sidewalls and a rear wall which intersect one another at respective corners. Although described with reference to one specific construction of roof and wall components, this is by way of example only. That is, the invention is not limited to this specific application and may be used to seal other types of joints between vehicle component surfaces as well as other forms of vehicle roof to wall connections. For example, the method and apparatus is applicable to sealing vertical joints between vehicle components, although advantages exist in connection with sealing horizontal surfaces of roof components to horizontal surfaces of vehicle walls.

Figure 1:
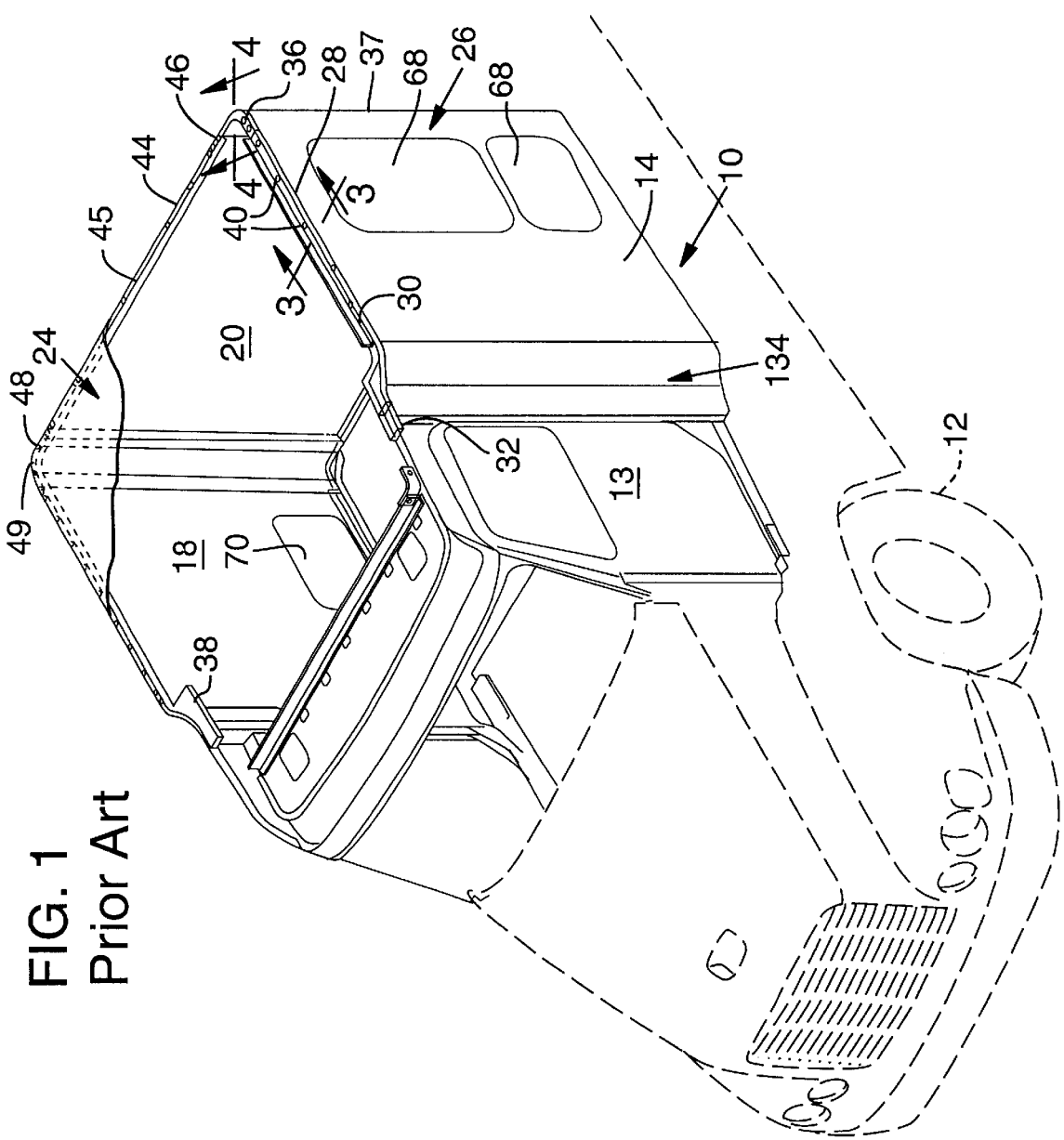
FIG. 1 is a perspective view of a prior art truck with a substantial portion of a roof component of the truck broken away to provide visibility to upper surfaces of sidewalls and an end wall of the truck.

FIG. 1 illustrates a truck 10 having a frame supported by wheels 12. The truck has a door 13 included in a first sidewall 14 which is opposed to a second sidewall 18 at the opposite side of the truck. In addition, the truck 10 includes a rear wall 20, FIG. 2. A roof 24 forms a cap or enclosure which is mounted to the sidewalls and back wall to complete the truck cab structure. The illustrated truck also includes a rear sleeper compartment 26, typically including a bunk and other amenities for use by a long-haul truck driver. The dimensions of the sleeper compartment may vary. For example, particular truck models may have sleeper compartments which are elongated lengthwise in a direction parallel to the longitudinal axis of the truck in comparison with the length of sleeper compartments of other truck models. The present invention is not limited to trucks with sleeper compartments, but is beneficial in such applications. The illustrated roof 24 in effect forms a cap with a joint between the roof and walls being indicated generally at 28. The illustrated roof 24 is of a mid-high roof configuration. The roof may be of the high-rise type or any other form so as to form the top or roof enclosure for the cab structure. As is apparent from FIG. 1, the upper edge portion of sidewall 14 has a inwardly directed flange 30 extending along a substantial portion of the upper edge of the sidewall. The illustrated flange 30 extends from a location 32, just forwardly of the sleeper compartment, to a location 36 near or adjacent to the driver's side rear corner 37 of the sleeper compartment 26. The flange 30 may be formed in any convenient manner. For example, if sidewall 14 is comprised of aluminum sheet metal, the flange 30 may be formed by bending the upper edge of the aluminum sidewall forming sheet. Alternatively, the flange may be formed by attaching an inwardly extending reinforcing element to the upper edge of the sidewall 14. Thus, the flange 30 need not be unitary or of one-piece construction with the sidewall 14, although it may be so-constructed. The sidewall may also be of composite or other materials and typically includes reinforcing ribs, not shown in FIG. 1. The flange 30 may be continuous between its start point 32 and end point 36, or it may be formed in discrete sections. The flange 30 may also extend continuously along the entire sidewall or along a major portion of the length of the sidewall 14. In one exemplary construction, the flange 30 extends along at least about ninety percent of the upper edge of that portion of the sidewall which bounds the sleeper compartment. Sidewall 18 also has an upper edge portion with an inwardly directed flange 38. The sidewall flange 38 is typically the mirror image of the sidewall flange 30. Each of the sidewall flanges 30, 38 typically include fastener receiver openings spaced apart along their length, with some of these openings being indicated at 40 in FIG. 1. The back wall 20 also has an upper edge portion 44. The back wall 44 may or may not have an inwardly directed flange. For example, a lap joint may be used at the back wall. Alternatively, the back wall may be provided with a flange extending along a major portion of the upper edge portion of the back wall 20. The flange may be formed in the same manner as flange 30. Alternatively, the flange may comprise an elongated reinforcing element 45 mounted to an upper edge portion of back wall 20, such as by mechanical fasteners such as bolts or rivets or otherwise. In the truck shown in FIG. 1, the back wall 20 commences at a location 46 adjacent to a corner 37 of the sleeper compartment and terminates at a location 48 adjacent to the other corner 49 of the sleeper compartment. Although not shown in FIG. 1, the back wall also typically has reinforcing ribs. The corner wall portions of the construction may also have an inwardly directed flange element. Openings, such as 68 and 70, may be provided in the respective sidewalls 14, 18 and are typically closed by doors.

Figure 2:
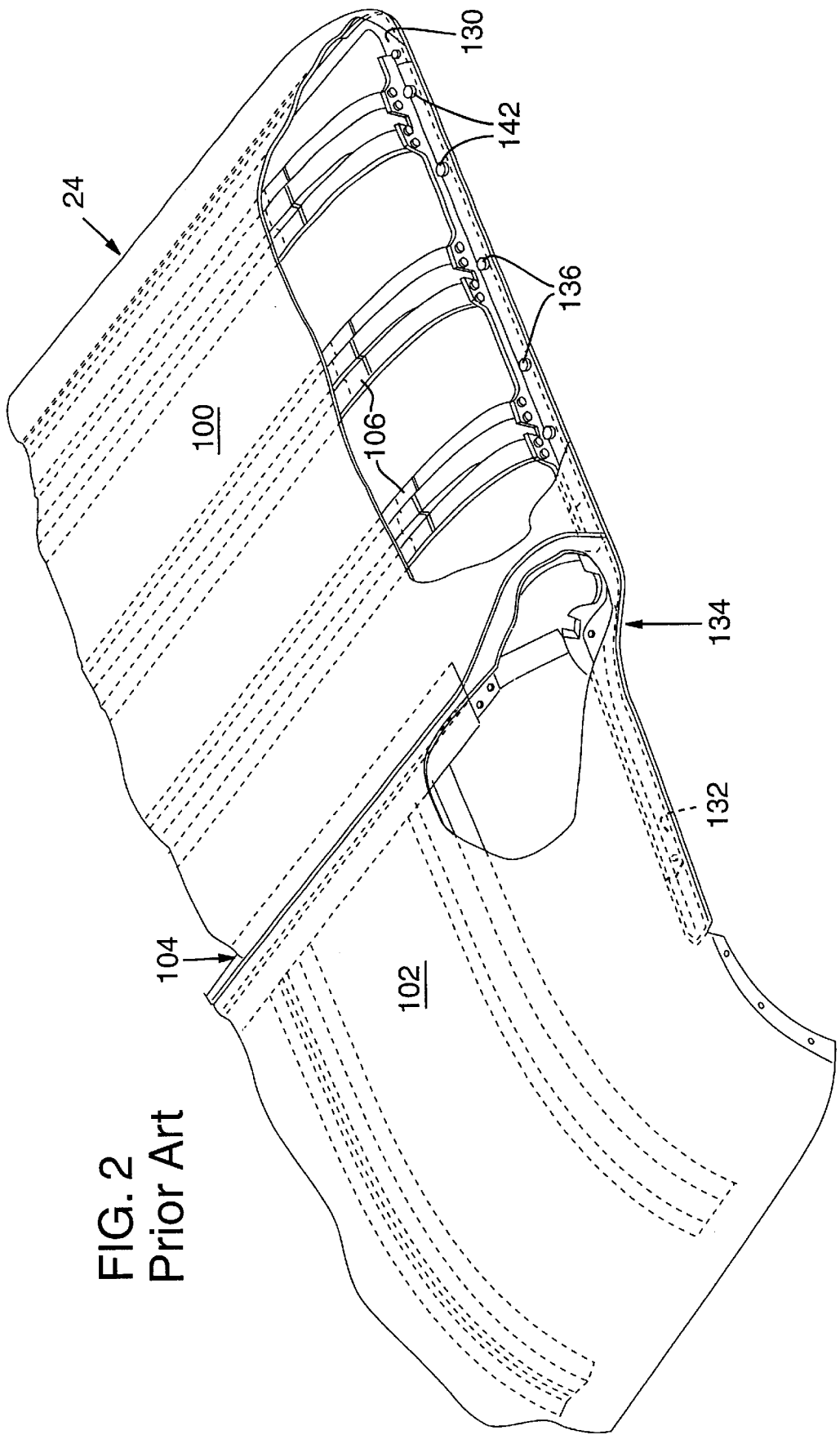
FIG. 2 is a perspective view of a prior art roof which may be used in the truck of FIG. 1.

One exemplary roof 24 is shown in FIG. 2. The roof 24 may be molded of fiberglass or of a composite or other material. Alternatively, the roof 24 may be made of metal, such as steel or aluminum. The roof in this case may be formed by stamping, casting or any suitable manufacturing process. The roof 24 may be of a unitary construction and it may assume a raised roof or other configuration different from that shown in FIG. 2.

The illustrated roof 24 is stamped of aluminum and includes a rear roof section 100 and a front roof section 102. The roof sections 100, 102 may be lapped over one another at location 104 to form a conventional lap joint. The joint 104 may be sealed as explained below in accordance with the present invention. Alternatively, adhesives or other caulking may be included at the lap joint, in addition to fasteners, to secure the roof sections together. Reinforcing brackets, some being indicated at 106, may be included to reinforce the roof construction.

The rear roof section 100 may include an inwardly directed flange portion 130, which, in the illustrated form, extends substantially or entirely around the entire lower periphery of the sides and rear of the roof section 100. The flange portion 130 may be continuous or discontinuous and may be formed by a portion of the roof or by separate elements connected to the roof. An inwardly directed flange portion 132 is also provided along sidewall joining portions of the roof section 102.

As can be seen in FIGS. 1 and 2, the sidewalls 14, 18 each include a transition region rearwardly of the doors where the width of the cab widens to the width of the sleeper compartment 26. The driver's side transition region is indicated generally at 134 in FIGS. 1 and 2 and may be of a generally s-shaped configuration in cross section as shown in these figures. Fastener receiving openings, some being indicated at 136 in FIG. 2, are provided through the flange 130 and also through reinforcing elements which may overlay or comprise the flange. Fastener elements, such as threaded nuts, may be welded or otherwise secured in alignment with the openings 136 for receiving threaded bolts or other fasteners when the roof 24 is joined to the walls 14, 18 and 20. Several of these nuts are indicated at 142 in FIG. 2.

With reference to FIG. 3, one upright rib 150 is shown along sidewall 14. In addition, in the construction shown in FIG. 3, the surface of inwardly directed roof flange 130 is positioned against a surface of inwardly directed sidewall flange 30. An elongated reinforcing element 152 over lies flange 130. In addition, an elongated reinforcing element 154 is positioned with a portion thereof underlying the flange 30. Thus, the flanges 30, 130 are sandwiched between reinforcing elements 152, 154 in this construction. A mechanical fastener, in this case a bolt 156, is threaded upwardly into the nut 142. The bolt passes through aligned openings through the respective reinforcing elements 152, 154 and flanges 30, 130. Bolt 156 is tightened to join these elements together. In the embodiment of FIG. 4, the flange 130 terminates outwardly of a bolt 160. However, an upper reinforcing element 162 sandwiches the edge of flange 130 between the element 162 and the lower flange element 45. A fastener 164, shown as a rivet, is shown as one approach for mounting the element 45 to the sidewall 14. In the FIG. 4 construction the element 45 thus comprises one form of an inwardly directed wall flange like flange 30. In addition, element 162 in combination with the shortened flange 130 in FIG. 4 constitutes another form of inwardly directed roof flange.

In a known approach for sealing the joint 28 of FIGS. 3 and 4, individuals manually control the application of caulking between the abutting components at these joints. When the respective bolts 156, 160 are tightened, the sealant forms the seal for the gap. As previously mentioned, it is difficult to manually control the application of sealant in a manner that does not leave gaps in the sealant bead along the length of the joint 28. In addition, excessive sealant is often applied. In such a case, the excess sealant is extruded from the gap to the exterior surface of roof 24 and walls 14, 20 when the respective bolts 156, 160 are tightened. It can be difficult to clean the sealant from the exterior surfaces of the wall, particularly after the sealant cures in the case of a curable sealant. This is particularly troublesome if these exterior wall surfaces and roof have already been painted. In this known approach, the sealant is applied to the upper surfaces of the sidewall and rear wall flanges with the roof cap then being lowered onto these sealant containing upper surfaces.

The detailed description of preferred embodiments to this point has been of an exemplary prior art roof and wall structure such as set forth in U.S. Pat. No. 5,769,486. U.S. Pat. No. 5,769,486 is hereby incorporated herein in its entirety by reference.

Figure 5:
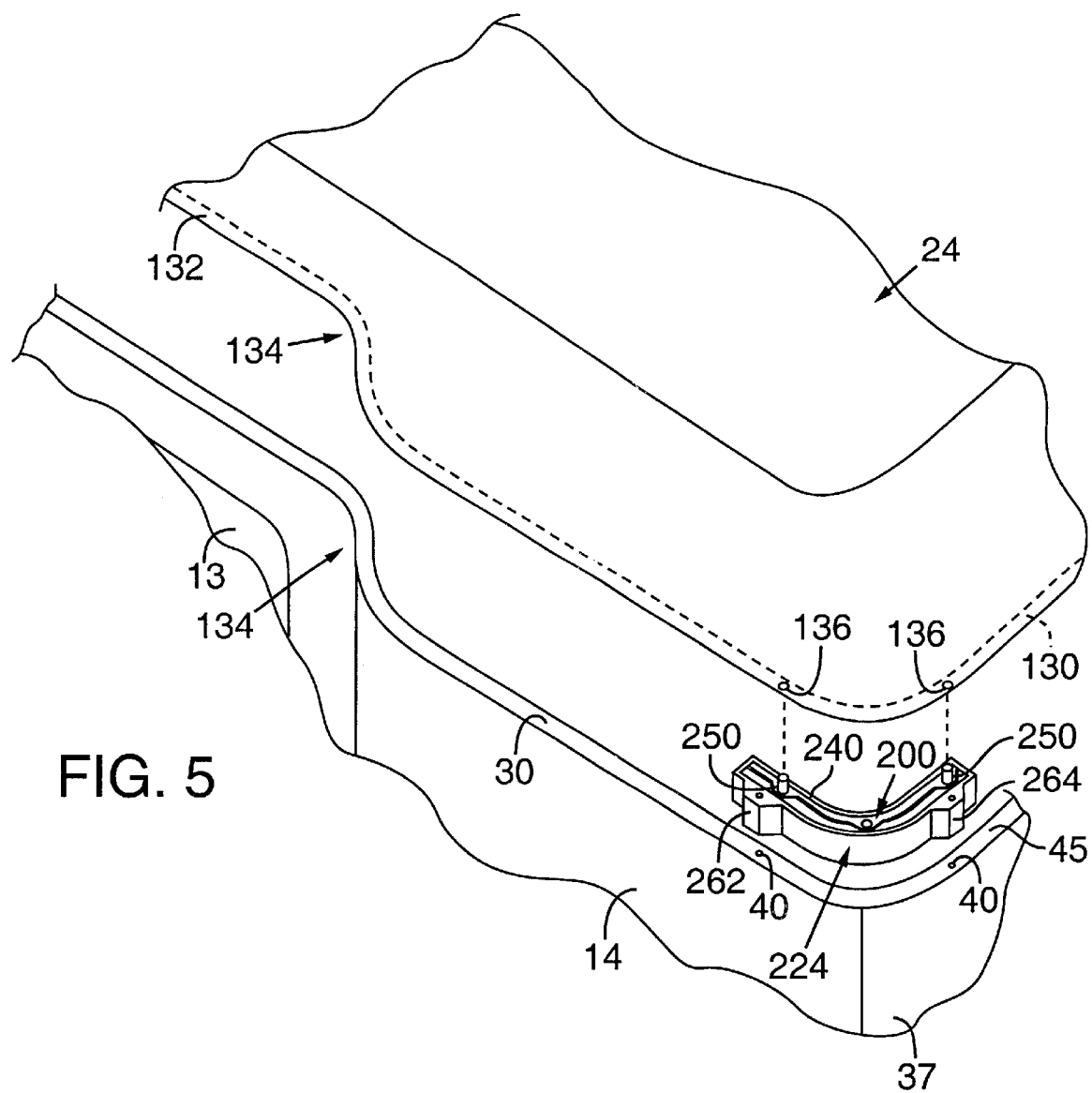
FIG. 5 is a schematic illustration of a portion of a vehicle roof and upper portions of a vehicle sidewall and end wall in position for receiving one form of a sealant containing sealing carrier member in accordance with an embodiment of the present invention.
Figure 6:
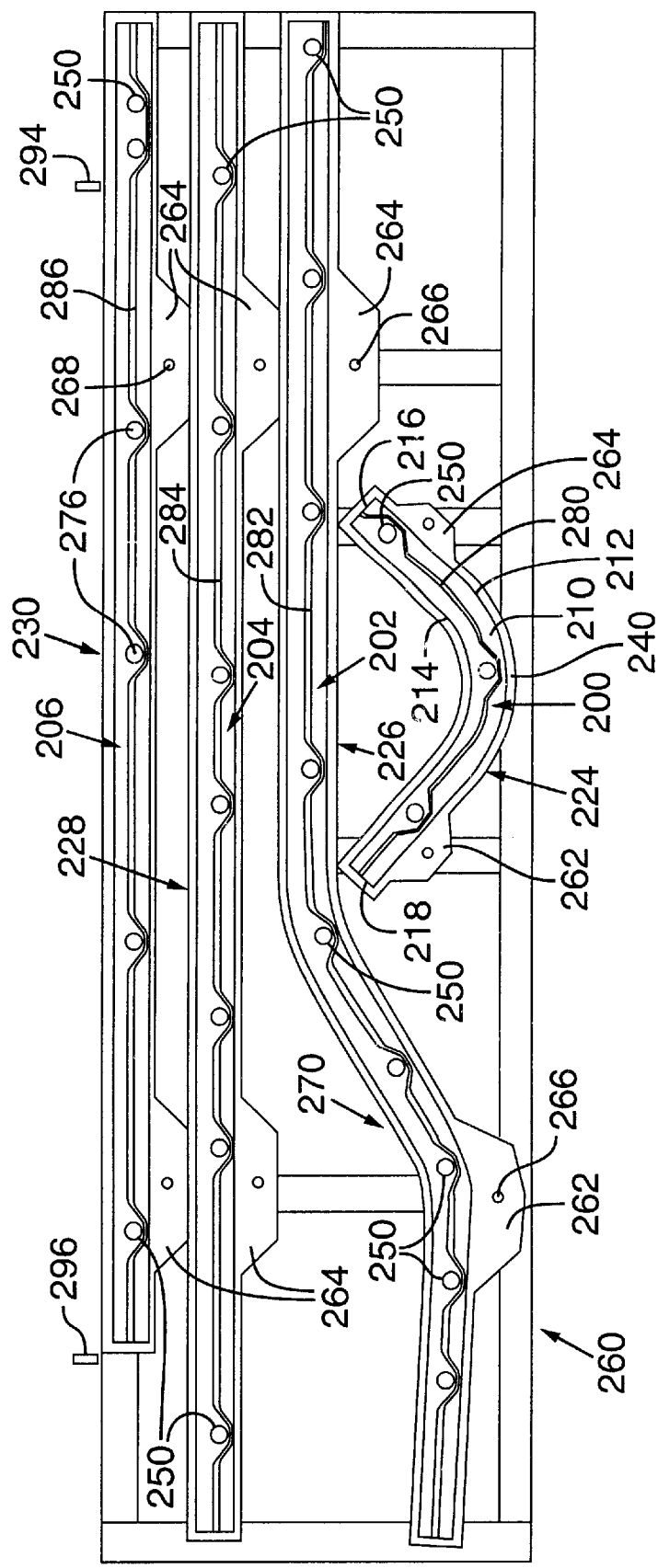
FIG. 6 is a top plan view of one embodiment of a rack having a set of sealant carrier member supports positioned on the rack and with a set of sealant carrier members positioned on the supports, all in accordance with one embodiment of the present invention.

With reference to FIGS. 5 and 6, and as best seen in FIG. 6, a first set of sealant carrier members 200, 202, 204 and 206 are shown. Although the sealant carrier members may be of other shapes and configurations, in the forms shown in FIG. 6, each of the sealant carrier members comprises an elongated strip of material having first and second major surfaces, first and second side edges, and first and second ends. With respect to sealant carrier strip 200, the first major surface is indicated at 210, the first outer and second inner side edges are indicated at 212, 214, and the ends are indicated at 216, 218. The second major surface is not shown in FIG. 6, but is indicated at 220 in FIG. 9. The second major surface 220 is thus opposed to the first major surface 210. In the illustrated embodiment, both of the first and second major surfaces 210, 220 are generally planar and parallel to one another, although this is not necessary.

In FIG. 6, a set of sealant carrier member supports, in this case strip carrier bases or supports are shown, one being provided for and associated with each of the sealant carrier strips. The supports are indicated in FIG. 6 as 224 for strip 200, 226 for strip 202, 228 for strip 204 and 230 for strip 206. The strips 200, 202, 204, and 206 are typically of a flexible porous material, such as of a non-woven synthetic or needle punched synthetic material. The supports 224, 226, 228 and 230 each have an upper planar surface (one being indicated at 240 for support 224) which, in the illustrated form, underlies and provides support for the major surface 220 of the associated strip. The base carriers may be of any convenient form which provides the desired support for the sealant carrier members. In the form shown in FIG. 6, each of the base carriers is an elongated element. The base carriers may be made of any suitable material. As a specific example, the base carriers may be made of a polymer material such as UMHW polyethylene. Consequently, the carriers are relatively easy to clean in the event sealant is applied to the carriers through inadvertence or otherwise.

An alignment mechanism is preferably provided for aligning each of the strips 200, 202, 204, and 206 at a desired location on the respective associated carriers. Although clamps or other mechanisms may be used, a simplified pin alignment approach is employed in the illustrated embodiment. In this approach, each of the base carriers includes a plurality of alignment pins extending outwardly from the upper surface 240 of the base carriers. In FIG. 6, the alignment pins are indicated at 250 for this set of strip carriers. The alignment pins are positioned for alignment with openings in one of the first and second components of the vehicle to be sealed. For example, in FIG. 5, the alignment pins 250 of base carrier 224 are positioned so as to be aligned with fastener receiving openings 136 in the flange 130 of the roof component 24. The respective illustrated sealant carrier strips each have a plurality of alignment pin receiving openings which extend between the major surfaces 210, 220 and which are positioned to receive the alignment pins 250 of the associated strip carrier or support.

The base carriers may be positioned on a rack such as indicated at 260 in FIG. 6. Rack 260 may comprise a table or other supporting structure as well as the form shown in FIG. 6. Thus, the term rack is understood to mean a structure, regardless of form, for holding one or more base carriers, such as the set of base carriers shown in FIG. 6, in position for sealant application. A base carrier positioner mechanism may be included in the construction for positioning the base carriers, and thus supported sealant carrying strips, at a desired known location for the application of sealant. In one illustrated approach, each of the base carriers includes at least one handle, and in this case two spaced apart handles 262, 264 which project outwardly from the body portion of the respective base carriers. Each of the handles 262, 264 may include one or more positioning pin receiving openings, some being indicated at 266 in FIG. 6. Each of the openings 266 receives a positioning pin which projects upwardly from the rack 260. One such positioning pin is indicated at 268 in FIG. 6. With this approach, the base carriers, and thus the supported sealant carrying strips, are positioned at a desired location on the rack. In addition, the rack may also be positioned at a known location relative to a coordinate system. As a result, an x-y sealant applicator, such as described more fully below, may be used to apply sealant in a precise manner to each of the sealant carrier strips. The sealant application is typically accomplished at a location which is remote from the vehicle components being sealed. Thus, for example, following the application of sealant to a sealant carrier strip such as strip 200 in FIG. 6, the carrier 224 with the supported sealant containing strip 200 may be removed from the rack and taken to the location of the vehicle components for use in positioning the sealant strip and carrier at least partially between the components being sealed. The carrier 224 may then be removed prior to joining the components together to accomplish the seal.

As can be seen from FIG. 6, the sealant carrier strip 200 is curved and extends through an angle of about ninety degrees. In addition, the sealant carrier strip 202 has a curve which corresponds to the curve at the transition region 134 of the truck (see FIG. 2). That is, strip 202 in this case has a generally s-shaped transition region indicated at 270. In general, the strips are shaped and configured to follow the geometry of the gap which is being sealed. At least a portion of the strip is positioned in the gap with at least some of the sealant being positioned therein such that the sealant seals the gap at the location thereof.

In the embodiment shown in FIG. 6, the respective strips 200, 202, 204 and 206 include additional openings through the strips from the first to second major surfaces in addition to the openings which receive the alignment pins 250. Some of these additional openings are indicated at 276 in FIG. 6. In general, openings are provided in the sealant carrier strips at locations where fastener receiving openings 40, 136 are provided (FIGS. 1, 2). Although less desirable, these strips may be constructed with thinned easily ruptured areas where the openings are to be provided or may simply be opening free and punctured after they are in place on a component to be sealed, for example, by fasteners used in joining the components to be sealed together during a sealing operation.

Sealant, which may be applied in at least one elongated bead, is applied to the upper major surface 210 of each of the strips 200, 202, 204 and 206. Other sealant application patterns may be used. In this specific example, sealant beads are indicated at 280 for strip 200, 282 for strip 202, 284 for strip 204 and 286 for strip 206. The respective sealant beads (the term bead being understood to include other than cylindrical application patterns) shown in FIG. 6 extend continuously generally from one end to the opposite end of each strip.

Preferably, as will be understood with reference to bead 280, adjacent to openings in the strips, the sealant is positioned between the openings through the strip and the outside edge 212 of the strip. As a result, in the region of the fasteners which pass through these openings, sealant is positioned between the fastener and the exterior of the vehicle at the joint.

As explained more fully below, the sealant may be applied in a non-uniform manner to the carrier strips. More specifically, the volume of applied sealant may be selectively varied. As a specific example, adjacent to the ends of the strips, a thicker or higher volume of sealant may be applied. This can be accomplished, for example, by slowing the movement of a sealant applicator at such location while maintaining the sealant flow rate so that a greater volume of sealant is applied at such location. Consequently, when sealant strips are applied end to end (for example, see FIG. 7 for the driver's side of a truck) gaps may exist between the ends of adjacent strips. The excess sealant at these locations flows into any such gaps and seals these locations. As previously mentioned, these strips may be applied with ends overlapping one another without affecting the seal, although in this case the volume of sealant at the ends would typically be reduced to avoid the application of excess sealant at such locations. Also, additional sealant may be applied at locations and in a desired pattern at other locations, for example where a recess or gap exists in the joint components being sealed. In addition, as can be seen in FIG. 6, in this example, at the locations of the fastener receiving openings, a lesser quantity of sealant may be applied. At such locations, a shorter distance exists between the outer edge of the joint and the location at which the sealant is applied in comparison to the distance at locations between the openings. By reducing the amount of sealant that is applied at such fastener locations, the problem of excess sealant being squeezed outwardly from the joint at such locations is minimized. However, enough sealant is applied to seal the joint at such locations.

Figure 7:
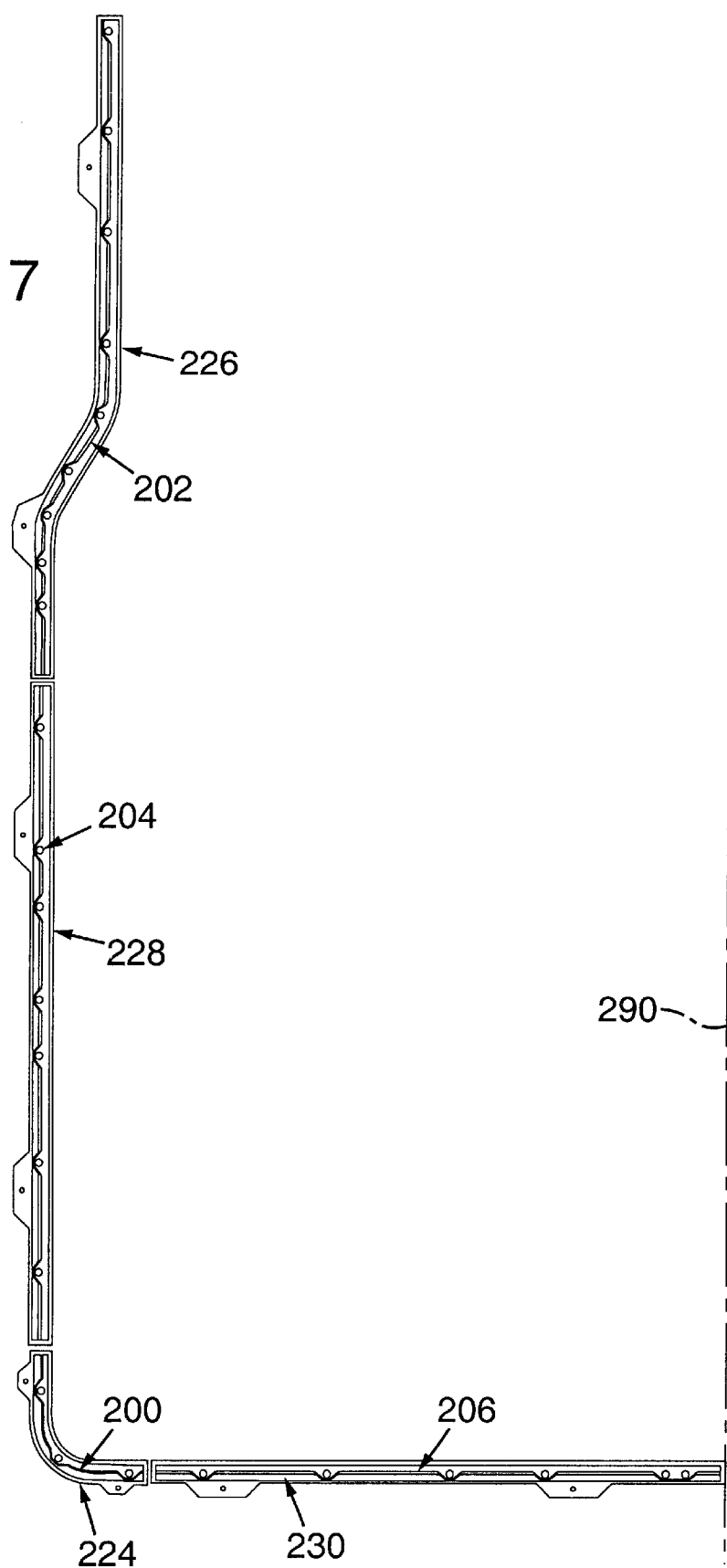
FIG. 7 schematically illustrates a set of supports and sealant carrier members of one embodiment which are arranged to show an example of how the sealant carrier members may be configured to follow the contours of a portion of the back wall, corner and sidewall at the driver's side of the truck of FIG. 1, it being understood that the set shown in FIG. 6 is for the passenger's side of the truck of FIG. 1 and is the mirror image of the set shown in FIG. 7.

The set of base carriers and sealant strips shown in FIG. 6 are for the passenger side of the vehicle. FIG. 7 shows a set of base carriers and sealant carrier members in the form of strips for the driver's side of the vehicle of FIG. 1. The base carriers and sealant carrying strips of FIG. 7 are typically mirror images of the base carriers and sealant carrier strips of FIG. 6. Consequently, for convenience, the same numbers are used in FIG. 7 as have been used in FIG. 6 for corresponding elements. The dashed line 290 in FIG. 7 corresponds to the longitudinal center line of the vehicle in this specific example.

Typically an entire set of base carriers and strips for one side of a vehicle are placed on rack 260. The sealant is then applied to the exposed major surface 210 of each of the strips. Following the application of the sealant, the respective base carriers and supported strips are transported one at a time (although more than one may be transported at once). Each base carrier and strip is then placed at the appropriate location relative to the component to be sealed with the strip then being pressed against a surface of the component to be sealed so that the sealant adheres the strip in place. The base carrier is then removed. The base carrier for the next strip is then typically positioned such that the strip is placed on the component surface to be sealed in the same manner. This is repeated until all of the strips are in position. Alternatively, more than one strip may be applied simultaneously to the component surface to be sealed.

In the construction of FIG. 6, a mechanism is included for determining which set of base carriers and strips is in place on the rack 260 in situations where more than one set of carriers and strips are used. Detectors may be used for this purpose. The detectors produce an output signal, such as to a controller of a conventional x-y applicator to indicate to the controller which set of base carriers and strips are in place on the rack. The controller then causes the application of the appropriate pattern of sealant to the strips. Alternatively, an operator may indicate to the controller, using a key pad or other data entry mechanism, which set of carriers is on the rack. In one specific approach, first and second photosensors 294, 296 are provided. When the first set of base carriers is in position, detector 294 senses the base carrier 230 while detector 296 does not sense such a base carrier. A signal from sensor 294, indicating the presence of base carrier 230, signals the controller that the passenger side set of base carriers (in this example) are on the rack. In the event the driver's side base carriers are positioned on the rack, carrier 230 for the driver's side set is shifted to the left in FIG. 6 such that sensor 296 detects the presence of the base carrier while sensor 294 does not. Again, the controller determines from these signals that the driver's side set of base carriers is in place. By employing left and right hand sets of base carriers corresponding to the left and right hand sides of the vehicle, the overall dimensions of the sealant application rack 260 may be reduced, as compared to the case wherein an entire set (both right and left hand side base carriers) are supported on a single rack (although this latter approach is an option).

The base carrier 228 and associated strip 204 may be varied in length to correspond to the length of the sleeper cab portion 26 of the truck. Thus, for a given model of truck with a specified dimension of sleeper cab, one simply includes the appropriate length base carrier 228 for that model of cab in the set of base carriers. In addition, a sealant carrier strip of the desired length is then used.

Figure 8:
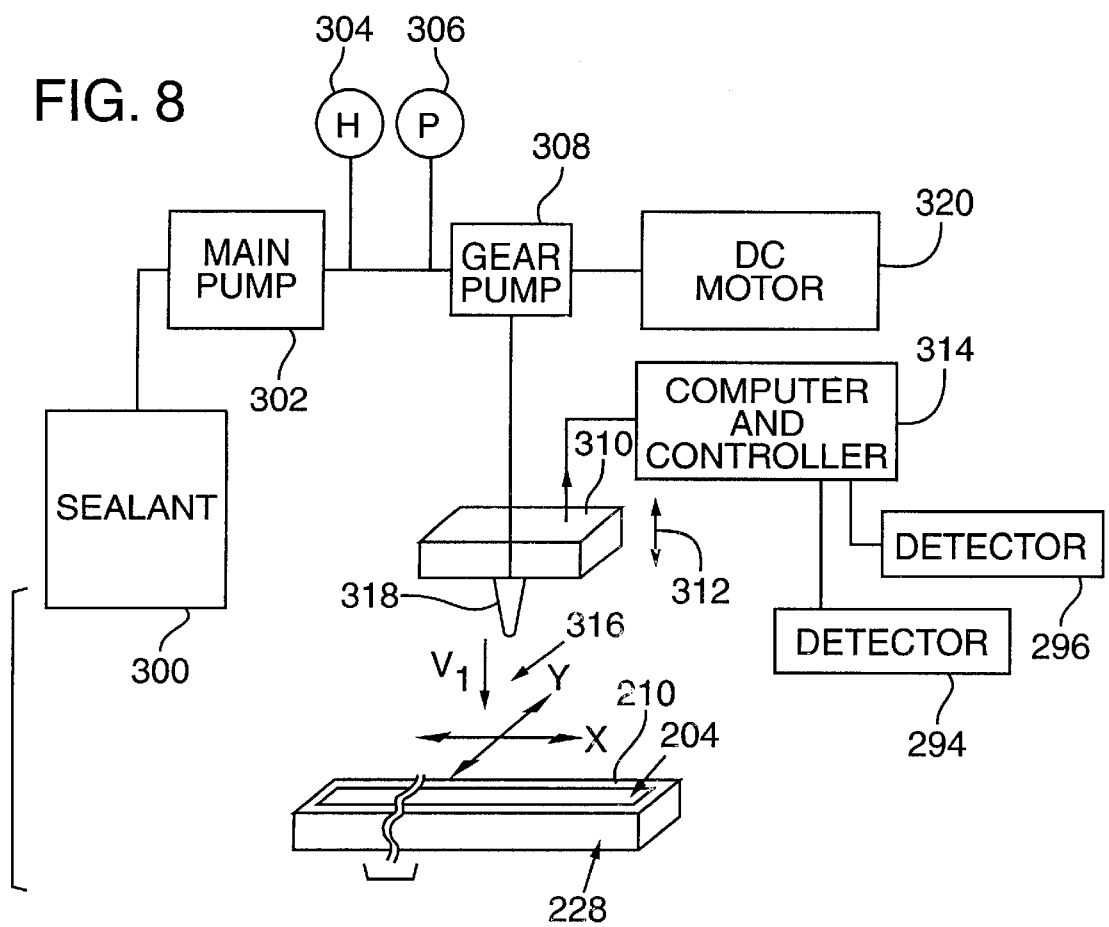
FIG. 8 is a schematic illustration of one form of an apparatus useful in applying sealant to sealant carrier members.

FIG. 8 illustrates one example of an apparatus for applying the sealant. In this example, sealant is contained within a tank or container 300. The viscosity of this sealant is preferably selected in combination with the porosity of the sealant carrier -strips so that the sealant does not penetrate through the sealant carrier strips when initially applied to the exposed upper major surface 210 of the carrier strip. In addition, the viscosity of sealant is selected so as to adhere the strips to the component surface when the base carrier for the strip is removed. As a specific example, a urethane based sealant having a viscosity of 60,000 centipoise may be used. One specific example of such a sealant is Sikaflex 221 sealant available from Sika Corporation of Lyndhurst, N.J. This sealant not only seals the joint 28, but also acts to bond the joint when the sealant cures. Sealant is drawn from the container 300 by a main pump 302. An optional heater 304 may be included in the line leading to the main pump, in the sealant container, or in the line exiting from the main pump as shown in FIG. 8. A pressure sensor 306 may also be included in the line exiting from the main pump. A gear pump 308, in this specific example, is used to deliver the sealant from the main pump to a nozzle support 310. The nozzle support may be movable in the z direction (indicated by arrow 312) by, for example, a pneumatically actuated cylinder (not shown). The nozzle is typically positioned, in one example, within about five mm of the upper surface of the sealant carrier member during sealant application. The nozzle support 310 is controlled by a computer and controller 314 for movement in x and y directions relative to a coordinate system 316 in FIG. 8. In this case, the x and y directions are in a horizontal plane. A sealant application nozzle 318 is supported by support 310. Sealant from gear pump 308 is delivered to nozzle 318 for application to the sealant carrier strips on the base carriers. The computer and controller 314 and x-y movable support 310 is commercially available. For example, a commercially available computer controlled x-y movable support from Alan Bradley Company may be used. A DC motor 320 may be used to drive the gear pump 308. The pressure sensor 306 monitors the pressure in the line leading to the gear pump 308. If the pressure drops too low, the system may be shut down before the gear pump 308 is starved of sealant. For example, an alarm may sound if the pressure drops below 500 psi and the system may be shut down if the pressure drops below 450 psi.

The nozzle 318 may have an orifice of a dimension which is selected for application of the desired amount of sealant to the sealant carrier strips. As a specific example, and although this may be varied, for the specific exemplary sealant mentioned above and at a flow rate of 13.8 grams per ten seconds, a nozzle diameter of three thirty seconds of an inch was suitable. The flow rate of sealant toward the sealant carrier strips may be varied. Although the flow rate may be varied to vary the uniformity of the application of sealant to the strips if a nonuniform sealant application is desired, the apparatus of FIG. 8 simplifies the application of sealant in selectively variable amounts. That is, the velocity of movement of support 310 may be increased to result in a lesser amount of sealant being applied and decreased or stopped to result in a greater amount of sealant being applied, with a constant sealant flow rate being provided through the nozzle. To minimize the possibility of sealant lifting the strips upwardly toward the nozzle during sealant application, the sealant flow rate is preferably adjusted such that the velocity $V_1$ in the Z direction 312 of the applied sealant is greater than the velocity of travel of the support 310 and nozzle 318 in the x/y plane. Also, the jet velocity is preferably established to be low enough so as to not drive the sealant through the sealant carrier strips from surface 210 to the opposed major surface while the sealant is being applied. Although variable, the sealant velocity in the z direction may range from about two times to about three times the velocity of the nozzle in x-y directions at locations between the openings where typical quantities of solvent are being applied. For example, for a nozzle x-y velocity at locations between the strip openings of 100 mm/sec for Sikaflex 221 sealant being applied at 13.8 grams per ten seconds through a three-thirty seconds diameter nozzle, the velocity of sealant through the nozzle would range in the example from 200 to 300 mm per second. The nozzle also was moved at a velocity of about fifty mm per second at the ends of the strips or allowed to briefly dwell at the ends to apply additional sealant at the end locations. This example also used the Reemay® strip material described below.

The porosity of the sealant carrier strips is preferably selected to permit penetration of the selected sealant through the sealant carrier strips and between the major surfaces of the strips when the components to be sealed are tightened together to compress the strips while minimizing or eliminating the possible passage of sealant through the carrier strip during application of the sealant to the strips. The sealant strips may be a non-woven fabric having the desired porosity, a needle punched bonded material, a material with minute apertures therethrough, or any other type of material which has the desired sealant flow properties. Specific examples of suitable materials include a non-woven synthetic material sold under the brand name Reemay®, model 2430 having a weight of 2.4 ounces per square yard and having a Frazier Air Permeability of 425 cubic feet per minute per square foot at one-half inch of water. Another specific example is a bonded needle punctured mechanically entangled fabric such as model HO54 uncalendered fabric from Hobbs, Bonded Fibers of Waco, Texas. This latter fabric is formed of 6 dinear polyester with EVLC resign added on at 25 percent and is of a thickness of from about 0.15 inch to about 0.20 inch. Again, it is preferable that the sealant carrier strips have a porosity which minimizes and most preferably eliminates the passage of sealant through the strips during sealant application to the strips. In addition, the carrier strip porosity is selected to facilitate the passage of sufficient sealant through the strips upon application of pressure as components to be sealed are drawn together to provide sealant at both major surfaces of the sealant carrier strips when the components are assembled.

It should be noted that it is preferable to use an automatic or semiautomatic robotic applicator to apply sealant to the sealant carriers with one such application system being shown in FIG. 8. However, although less desirable, it is possible to manually apply sealant to the strips. It is also possible to apply sealant to strips supported on carriers which are not transported with the strips when the strips are being positioned for the sealing application, although this is less preferred. In addition, it is possible to apply sealant directly to the strips with the strips being supported on a table or the like without base carriers, but this is also less preferred.

Figure 9:
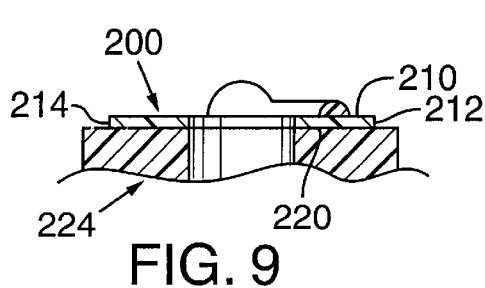
FIG. 9 illustrates a sealant carrier member on a support with sealant thereon and shows a variation of the volume of sealant in the region of an opening through the sealant carrier member and also showing the positioning of sealant along the exterior of the sealant carrier member at such openings, in accordance with one exemplary embodiment of the present invention.
Figure 10:
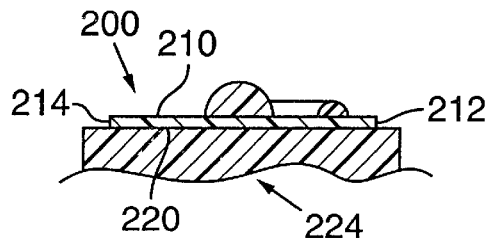
FIG. 10 is a vertical sectional view similar to FIG. 9, but taken at a location spaced from fastener receiving openings through the sealant carrier member.

FIGS. 9 and 10 show sealant on the sealant carrier strip 200 with the sealant carrier strip supported on the strip carrier 224. FIG. 9 shows the pattern of sealant that may be provided around one of the strip openings (e.g. a lesser quantity of sealant between the strip opening and outer edge 212 of the strip). FIG. 10 illustrates a sealant pattern which is centered on the strip at a location away from a strip opening and which includes a higher volume of sealant at such locations.

FIG. 11 illustrates the roof component 24 and sidewall component 14 supported in position for application of sealant carrier strips. Typically, the under surface of flange 130 and upper surface of flange 30 are about eight inches apart to facilitate the ease of positioning the strip carriers and sealant carrying strips in the gap between these components. As can be seen in FIG. 11, base carrier 228 and supported strip 204 (shown in exaggerated thickness) are positioned with the alignment pins (one such pin 250 being indicated in FIG. 11) in alignment with and inserted partially through alignment openings which may be the fastener receiving openings. In this example, the pin 250 passes through a fastener receiving opening and through a nut 142. The sealant 284 is shown on the upper major surface 210 of sealant carrier strip 204. Carrier 228 is raised upwardly in this example to press surface 210 against the under surface of flange 130. This causes sealant 284 to spread somewhat and adhere the carrier strip 204 to flange 130. The base carrier 228 is then pulled downwardly and removed from the space between the flanges 130, 30.

FIGS. 12 and 13 illustrate the roof 24 assembled to the wall 14 at two selected locations corresponding to the locations of FIGS. 3 and 4. In these figures, the sealant carrier strips 204, 200 are shown in place. Sealant penetrates between the opposed major surfaces of these strips to provide a seal in the gap 28 at the joint between the roof and sidewall components. The thickness of the strips 204, 200 in these figures is exaggerated. That is, the material is compressible and would be extremely difficult to see through the gap 28. In other words, the gap 28 in a typical case would be substantially closed.

FIG. 14 illustrates a completed joint (again with the gap exaggerated for purposes of illustration only) and shows the sealant 330 penetrating the strip 204 from major surface 210 to major surface 220. FIG. 15 illustrates the sealant 332 in the region of a fastener 156. The quantity of sealant 332 is reduced at this location (for example, approximately one-half the amount of sealant shown at location 330) and is positioned at the outer or exterior side of the opening through which bolt 156 passes.

The present invention, as exemplified by the embodiments described herein, provides an effective and efficient method and apparatus for sealing joints between vehicle components. In the illustrated examples, the sealant carrying strips are shifted upwardly against a surface of an exemplary roof component. This is advantageous because gravity lends to hold the strips on the associated strip carriers as the strips and carriers are moved in this manner. However, these strips may alternatively be applied to the wall portions of the vehicle structure on the other vehicle components. Although the invention has been illustrated and described with reference to several specific embodiments, the invention is not limited to these specific embodiments, as these embodiments may be modified in arrangement and detail without departing from the principles of our invention. We claim all methods and systems which fall within the scope of the following claims.

What is claimed is:

1. A method of sealing a gap between a first component surface of a first component of a vehicle and a second component surface of a second component of a vehicle, the method comprising:

applying sealant to a first carrier surface of a porous sealant carrier member, the sealant carrier member having a second carrier surface which is opposed to the first carrier surface;

placing at least a portion of the first carrier surface containing sealant in the gap;

closing the gap such that at least a portion of the sealant carrier member containing the sealant is squeezed between the first and second component surfaces , the porosity of the sealant carrier member being such that at least some of the sealant passes from the first carrier surface to the second carrier surface as the gap is closed, whereby the sealant creates a seal in the gap; and wherein the act of closing the gap comprises tightening a plurality of fasteners.

2. A method of sealing a gap between a first component surface of a first component of a vehicle and a second component surface of a second component of a vehicle, the method comprising:

applying sealant to a first carrier surface of a porous sealant carrier member, the sealant carrier member having a second carrier surface which is opposed to the first carrier surface;

placing at least a portion of the first carrier surface containing sealant in the gap;

closing the gap such that at least a portion of the sealant carrier member containing the sealant is squeezed between the first and second component surfaces, the porosity of the sealant carrier member being such that at least some of the sealant passes from the first carrier surface to the second carrier surface as the gap is closed, whereby the sealant creates a seal in the gap; and wherein there are at least two of said carrier members, each carrier member being in the form of an elongated strip with ends, wherein the act of placing comprises placing at least a first end of a first of the at least two carrier strips in the gap and placing at least a first end of a second of the at least two carrier strips in the gap and adjacent to the first end of the first of the at least two carrier strips, and in which the applying act comprises the act of applying the sealant to the first carrier surface of each of the at least two carrier strips.

3. A method according to claim 2 wherein the applying act comprises the act of applying the sealant as an elongated bead of sealant along at least a substantial portion of the length of each of the at least two strips.

4. A method according to claim 3 in which the applying act comprises the act of applying an elongated bead in a selectively varied nonuniform volume along the length of each of the at least two strips.

5. A method according to claim 4 wherein the applying act comprises the act of applying a greater quantity of sealant adjacent to the first ends of the at least two strips.

6. A method of sealing a gap between a first component surface of a first component of a vehicle and a second component surface of a second component of a vehicle, the method comprising:

applying sealant to a first carrier surface of a porous sealant carrier member, the sealant carrier member having a second carrier surface which is opposed to the first carrier surface;

placing at least a portion of the first carrier surface containing sealant in the gap;

closing the gap such that at least a portion of the sealant carrier member containing the sealant is squeezed between the first and second component surfaces, the porosity of the sealant carrier member being such that at least some of the sealant passes from the first carrier surface to the second carrier surface as the gap is closed, whereby the sealant creates a seal in the gap;

the method comprising the act of placing the sealant carrier member on a sealant carrier member support with the first carrier surface exposed to receive the sealant, the applying act comprising the act of applying sealant to the first carrier surface while the sealant carrier member is on the sealant carrier member support;

the placing act comprising positioning at least a portion of the sealant carrier member support and of the sealant carrier member supported thereon in the gap and bringing sealant on the first carrier surface into contact with the first component surface to adhere the sealant carrier member to the first component surface; and wherein the method also includes the act of removing the sealant carrier member support prior to squeezing the sealant carrier member between the first and second component surfaces.

7. The method of claim 6 wherein the first component is a roof component of a vehicle and the first component surface is a surface of the roof component, and wherein the act of bringing sealant on the first carrier surface into contact with the first component surface comprises the act of raising the sealant carrier member support and the sealant carrier member supported thereon upwardly toward the first component surface.

8. A method of sealing a gap between a first component surface of a first component of a vehicle and a second component surface of a second component of a vehicle, the method comprising:

applying sealant to a first carrier surface of a porous sealant carrier member, the sealant carrier member having a second carrier surface which is opposed to the first carrier surface;

placing at least a portion of the first carrier surface containing sealant in the gap;

closing the gap such that at least a portion of the sealant carrier member containing the sealant is squeezed between the first and second component surfaces, the porosity of the sealant carrier member being such that at least some of the sealant passes from the first carrier surface to the second carrier surface as the gap is closed, whereby the sealant creates a seal in the gap; and wherein the first component includes a plurality of fastener receiving openings and wherein the sealant carrier member support includes a plurality of alignment pins, the method including the step placing the alignment pins in fastener receiving openings of the first component to align the sealant carrier member support and the sealant carrier member supported thereon with the first component surface.

9. A method according to claim 8 in which the sealant carrier member includes a plurality of openings, and wherein the act of placing the sealant carrier member on the sealant carrier member support comprises the act of inserting alignment pins of the sealant carrier member support through respective openings in the sealant carrier member prior to applying sealant to the first carrier surface.

10. A method according to claim 9 wherein the first and second component surfaces comprise inwardly directed flange elements of a respective roof and wall of a vehicle, and wherein the act of applying sealant comprises applying sealant along the sealant carrier member outwardly of the openings through the sealant carrier member at locations adjacent to the openings through the sealant carrier member.

11. A method according to claim 10 wherein the act of applying sealant comprises applying a lesser quantity of sealant at the locations adjacent to the openings through the sealant carrier member in comparison to the quantity of sealant applied to the sealant carrier member at least one other selected location.

12. A method of sealing a gap between a first component surface of a first component of a vehicle and a second component surface of a second component of a vehicle, the method comprising:

applying sealant to a first carrier surface of a porous sealant carrier member, the sealant carrier member having a second carrier surface which is opposed to the first carrier surface;

placing at least a portion of the first carrier surface containing sealant in the gap;

closing the gap such that at least a portion of the sealant carrier member containing the sealant is squeezed between the first and second component surfaces, the porosity of the sealant carrier member being such that at least some of the sealant passes from the first carrier surface to the second carrier surface as the gap is closed, whereby the sealant creates a seal in the gap; and including the act of placing a set of a plurality of sealant carrier member supports on a rack, the method including the act of placing a plurality of sealant carrier members on the sealant carrier member supports with each such sealant carrier member being associated with a respective one of the sealant carrier member supports, and wherein the act of applying sealant comprises the act of applying at least one elongated bead of sealant to each of the sealant carrier members.

13. A method according to claim 12 wherein a first set of sealant carrier members is provided for one portion of a vehicle and a second set of sealant carrier members is provided for a second portion of the vehicle, the method including the act of detecting whether the first or second set of sealant carrier members is positioned on the rack and the act of controlling the application of sealant depending upon whether the first or second set of sealant carrier members is detected.

14. A method of sealing a first roof component surface of a roof component of a vehicle to a second wall component surface of a wall component of a vehicle comprising:

placing at least one elongated sealant carrier strip of porous material on a strip carrier, the strip having first and second opposed major surfaces and first and second side edges extending between the first and second major surfaces, the strip carrier including at least two alignment pins and the carrier strip including apertures positioned to receive the alignment pins with the first major surface exposed to receive sealant when the strip is on the strip carrier;

extruding an elongated bead of sealant onto the first major surface of the strip while the strip is positioned at a location which is remote from the roof component and the wall component;

moving the strip carrier and the strip so as to position the first major surface containing the bead of sealant against the first roof component surface with the alignment pins positioned in apertures of the roof component such that the sealant adheres the strip to the first roof component surface;

removing the strip carrier;

compressing the strip between the first roof component surface and the second wall component surface and causing some of the sealant to travel from the first major surface of the strip to the second major surface of the strip, whereby sealant is positioned at both the first surface of the roof component and the second wall component surface of the wall component.

15. A method according to claim 14 in which there are at least one set of plural carrier strips and at least one set of a plurality of strip carriers, a respective carrier strip being associated with each strip carrier, wherein the acts of claim 14 are repeated for each carrier strip set and associated strip carrier.

16. A method according to claim 15 in which there are first and second sets of strip carriers and carrier strips, one set for each side of the vehicle.

17. A method according to claim 15 including the act of placing the set of strip carriers onto a supporting rack and carrier strips on the strip carriers prior to the application of the sealant.

18. A method according to claim 15 in which there are first and second sets of strip carriers and carrier strips, one set for each side of the vehicle, each set being positioned on a carrier rack during application of sealant to the carrier strips of the set, the method including the step of sensing whether the first set or second set is on the rack and for controlling the application of sealant to apply a desired pattern of sealant to carrier strips of the sensed set.

19. A method according to claim 14 in which the extruding act comprises applying the sealant using an x-y applicator.

20. A method according to claim 14 in which the extruding act comprises the act of selectively varying the thickness of the sealant bead.

21. A method according to claim 14 in which the extruding act comprises the act of applying a thicker bead of sealant adjacent to the ends of the carrier strips and a thinner bead of sealant adjacent to the alignment pins.

22. An apparatus according to claim 21 wherein the support positions the first major surface of each carrier strip of the at least one set of carrier strips in a common plane when the strip carriers are supported by the rack and the carrier strips are positioned on the associated supports.

23. An apparatus according to claim 22 including an x-y sealant applicator operable to apply sealant to the first major surface of each carrier strip of the at least one set of carrier strips when the carrier strips are positioned on the associated strip carriers and the strip carriers are supported by the rack.

24. An apparatus according to claim 23 wherein there are at least two of said sets of carrier strips and of said strip carriers, the apparatus including a detector for determining which of the sets of strip carriers is positioned on the rack, the x-y sealant applicator being responsive to the detector to apply sealant in a desired pattern for the set of strip carriers which is detected.

25. An apparatus for use in sealing a gap between a first component surface of a vehicle and a second component surface of a vehicle comprising:

at least one set of a plurality of strip carriers, each strip carrier including at least two outwardly projecting alignment pins;

at least one set of elongated porous sealant carrier strips, each of the carrier strips having opposed first and second major surfaces, each of the carrier strips also being associated with a respective one of the strip carriers, the carrier strips each having pin receiving openings positioned for alignment with the alignment pins of the associated strip carrier such that each carrier strip is positionable on the associated strip carrier with the first major surface exposed for receiving sealant and with the alignment pins of the associated strip carrier inserted into the pin receiving openings of the carrier strip; and a rack for detachably supporting the at least one set of strip carriers.

26. An apparatus according to claim 25 in which the rack includes a strip carrier positioner operable to engage and align the strip carriers on the rack.

27. An apparatus according to claim 26 in which the strip carrier positioner comprises a plurality of strip carrier alignment pins, the strip carriers each including strip carrier pin receivers into which the strip carrier alignment pins are inserted to engage and align the strip carriers on the rack.

28. An apparatus according to claim 27 in which each strip carrier includes at least two spaced apart projecting handles, and wherein at least one strip carrier pin receiver is located in each handle.

29. An apparatus according to claim 25 wherein the strip carriers each include at least one projecting handle.

30. An apparatus according to claim 25 wherein the at least one set of strips includes at least one strip which is curved.

31. An apparatus according to claim 30 wherein the at least one strip has an s-shaped curved section.

32. An apparatus according to claim 30 wherein the at least one strip curves through an angle of about ninety degrees.

33. An apparatus according to claim 25 wherein the first component surface corresponds to a portion of a roof of a truck having a sleeper cab and the second component surface corresponds to a portion of a wall of the truck, and wherein the at least one set of strips includes a sleeper cab side sealing strip for positioning between a section of the roof and sidewall along the sleeper cab of the truck, the sleeper cab side sealing strip being of a first length for a sleeper cab of a first length and of a second length for a sleeper cab of a second length.

34. An apparatus for use in sealing a gap between a first component surface of a vehicle and a second component surface of a vehicle, the apparatus comprising:
at least one set of a plurality of elongated sealant carrier strips having first and second major surfaces and first and second ends, the at least one set of a plurality of elongated carrier strips comprising at least first and second strips sized for positioning together in the gap with one of the ends of the first strip adjacent to one of the ends of the second strip;
the strips including a plurality of spaced apart openings therethrough; and
the strips being of a material having a porosity such that sealant applied to a first of the major surfaces does not penetrate through the strip to the second major surface in the absence of the application of pressure to the first major surface.

35. An apparatus according to claim 34 wherein at least one of the carrier strips of the set has a generally s-shaped transition defining region.

36. An apparatus according to claim 34 wherein at least the first carrier strip of the set extends through an arc of about ninety degrees and at least the second carrier strip of the set is a different shape than the shape of the first carrier strip.

37. An apparatus according to claim 34 wherein the at least one set of a plurality of strips comprises at least three strips of different shapes, sized for positioning in end-to-end relationship in the gap and wherein each of said three carrier strips has an elongated bead of sealant applied to the first major surface thereof.

38. An apparatus according to claim 37 including elongated sealant strip carriers, each sealant strip carrier being configured to support at least one respective associated strip.

39. An apparatus for use in sealing a gap between a first component surface of a vehicle and a second component surface of a vehicle, the apparatus comprising:
at least one set of a plurality of elongated sealant carrier strips having first and second major surfaces;
the strips including a plurality of spaced apart openings therethrough;
the strips being of a material having a porosity such that sealant applied to a first of the major surfaces does not penetrate through the strip to the second major surface in the absence of the application of pressure to the first major surface; and
wherein the first component surface comprises an elongated roof component surface of a truck and the second component surface comprises an elongated wall component surface of a truck, the truck having a back wall and first and second sidewalls, and wherein the at least one set of sealant carrier strips are configured to extend in a substantially end to end relationship along at least a portion of the first and second sidewalls and along the back wall.

40. An apparatus according to claim 34 wherein said one of the ends of the first strip is in contact with said one of the ends of the second strip.

41. An apparatus for use in sealing a gap between a first roof component surface of a roof component of a truck and a second wall component surface of a wall of a truck, the truck having a back wall and first and second sidewalls which are joined together with the back wall at respective corners, the sidewalls having a transition region between a forward cab portion of the truck and a rear sleeper portion of the truck, the apparatus comprising:
at least one set of a plurality of sealant strip carriers, each strip carrier comprising an elongated body having a first major surface and a plurality of alignment pins projecting outwardly from the first major surface;
the set of sealant strip carriers comprising at least one first sealant strip carrier with alignment pins arranged along an s-shaped path for carrying a sealant strip for positioning at one of the transition regions and at least one second sealant strip carrier with alignment pins arranged along a path that extends through about ninety degrees for carrying a sealant strip for positioning at one of the corners.

42. An apparatus according to claim 41 in which the set includes a third sealant strip carrier for carrying a sealant strip for positioning between the transition region and one of the corners and a fourth sealant strip carrier for carrying a sealant strip for positioning along at least a portion of the back wall of the truck.

43. An apparatus according to claim 42 in which the set includes at least two of the third sealant strip carriers of different lengths for respective use for trucks having sleeper portions of different lengths.

44. An apparatus according to claim 41 wherein each of the sealant strip carriers includes at least two spaced apart handles, each handle having an alignment pin receiving opening therein.

45. A truck comprising:
a roof component having a lower roof edge portion and an elongated roof flange extending inwardly from the roof edge portion along at least a major portion of the roof component;
a wall component having an upper wall edge portion and an elongated wall flange extending inwardly from the upper wall edge portion along at least a major portion of the wall component;
an elongated strip of porous material positioned at least partially between the wall flange and roof flange;
sealant penetrating the strip to provide a seal between the roof flange and wall flange;
the strip having a plurality of fastener receiving openings; and
roof fasteners extending through the plurality of fastener receiving openings and coupling the roof component to the wall component.

46. A truck according to claim 45 including a plurality of said strips arranged end to end.

47. A truck according to claim 45 in which the quantity of sealant between the wall flange and roof flange is reduced at locations adjacent to the fastener receiving openings.

48. An apparatus for sealing a gap between a first component surface of a first component of a vehicle and a second component surface of a second component of a vehicle, the apparatus comprising:

plural strip carrier means for detachably supporting a set of sealant carrier strips;

a set of porous carrier strip means, each strip means being carried by a respective associated one of the strip carrier means;

alignment means for aligning each strip means on the associated strip carrier means;

applicator means for applying a sealant bead to one surface of each of the strip means while the strip means is carried by the associated strip carrier means; and each of the strip carrier means being removable from the supported strip means following the positioning of the strip means in the gap, whereby upon closing the gap the sealant penetrates the strip means to seal the gap.

\* \* \* \* \*